United States Patent
Wagner et al.

(10) Patent No.: US 8,672,344 B2
(45) Date of Patent: Mar. 18, 2014

(54) CLADDING SECTION WITH AIRBAG FLAP ARRANGEMENT IN THE PASSENGER COMPARTMENT OF A MOTOR VEHICLE

(75) Inventors: Udo Wagner, Rüsselsheim (DE); Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 12/844,741

(22) Filed: Jul. 27, 2010

(65) Prior Publication Data

US 2011/0018241 A1 Jan. 27, 2011

(30) Foreign Application Priority Data

Jul. 28, 2009 (DE) .......................... 10 2009 034 916
Jul. 28, 2009 (DE) .......................... 10 2009 034 923
Jan. 30, 2010 (EP) ...................................... 10000963

(51) Int. Cl.
*B60R 21/205* (2011.01)
*B60R 21/215* (2011.01)

(52) U.S. Cl.
USPC ........................................ 280/728.3; 280/732

(58) Field of Classification Search
USPC ...................... 280/728.3, 731, 741, 752, 732
See application file for complete search history.

(56) References Cited

U.S. PATENT DOCUMENTS

| | | | |
|---|---|---|---|
| 4,327,937 A * | 5/1982 | Scholz et al. ................. | 280/732 |
| 4,893,833 A * | 1/1990 | DiSalvo et al. ............... | 280/732 |
| 5,342,085 A * | 8/1994 | Hirashima et al. ......... | 280/728.3 |
| 5,816,609 A * | 10/1998 | Gray et al. ................. | 280/728.3 |
| 5,829,778 A * | 11/1998 | Woolley et al. ............ | 280/728.3 |
| 6,012,735 A * | 1/2000 | Gray et al. ................. | 280/728.2 |
| 6,322,101 B1 | 11/2001 | Suizu et al. | |
| 6,835,439 B1 | 12/2004 | Kondo et al. | |
| 7,165,780 B2 | 1/2007 | Segura | |
| 7,552,940 B2 * | 6/2009 | Lindemann et al. ....... | 280/730.2 |
| 7,681,908 B2 * | 3/2010 | Fukawatase et al. ...... | 280/728.3 |
| 7,992,891 B2 | 8/2011 | Buehler et al. | |
| 2004/0212178 A1 | 10/2004 | Riesinger et al. | |
| 2006/0091650 A1 * | 5/2006 | Funakura ..................... | 280/732 |
| 2006/0131844 A1 | 6/2006 | Trevino et al. | |
| 2007/0040359 A1 | 2/2007 | Chen et al. | |
| 2009/0134608 A1 * | 5/2009 | Kang ........................ | 280/728.3 |

FOREIGN PATENT DOCUMENTS

| | | |
|---|---|---|
| DE | 3315535 A1 | 3/1984 |
| DE | 4306149 A1 | 9/1994 |
| DE | 4420929 A1 | 8/1995 |

(Continued)

OTHER PUBLICATIONS

European Patent Office, European Search Report for European Application No. 10000963.8, Dec. 6, 2010.

(Continued)

*Primary Examiner* — Karen Beck
(74) *Attorney, Agent, or Firm* — Ingrassia Fisher & Lorenz, P.C.

(57) ABSTRACT

A cladding section is provided for a passenger compartment of a motor vehicle. An airbag flap arrangement is located in the cladding section, and pivots along at least one hinge line during the actuation of an airbag. This type of cladding section provides that it have one stepped height difference on the surface relative to the passenger compartment, and that the airbag flap arrangement is located in the area of the height difference.

15 Claims, 4 Drawing Sheets

(56) References Cited

FOREIGN PATENT DOCUMENTS

| | | |
|---|---|---|
| DE | 68919946 T2 | 8/1995 |
| DE | 19847386 A1 | 9/1999 |
| DE | 10204333 A1 | 8/2003 |
| DE | 10307964 A1 | 6/2004 |
| DE | 10305545 A1 | 8/2004 |
| DE | 10306385 A1 | 11/2004 |
| DE | 102005026712 A1 | 1/2007 |
| DE | 102006008564 A1 | 8/2007 |
| DE | 102006016724 A1 | 10/2007 |
| DE | 102007021533 A1 | 12/2007 |
| DE | 102006060688 A1 | 6/2008 |
| DE | 102007034894 A1 | 1/2009 |
| EP | 1002703 A1 | 5/2000 |
| EP | 1527965 A1 | 5/2005 |
| EP | 1731381 A2 | 12/2006 |
| EP | 1750978 A1 | 2/2007 |
| FR | 2900890 A1 | 11/2007 |
| WO | 03011657 A1 | 2/2003 |
| WO | 2009053582 A1 | 4/2009 |

OTHER PUBLICATIONS

German Patent Office, German Search Report for Application No. 102009034916.2, dated Feb. 26, 2010.
German Patent Office, German Search Report for Application No. 102009034923.5, dated Feb. 26, 2010.
European Patent Office, European Search Report for Application No. 10000963.8, dated Dec. 6, 2010.
European Patent Office, European Office Action for Application No. 10000963.8, dated Feb. 24, 2012.

* cited by examiner

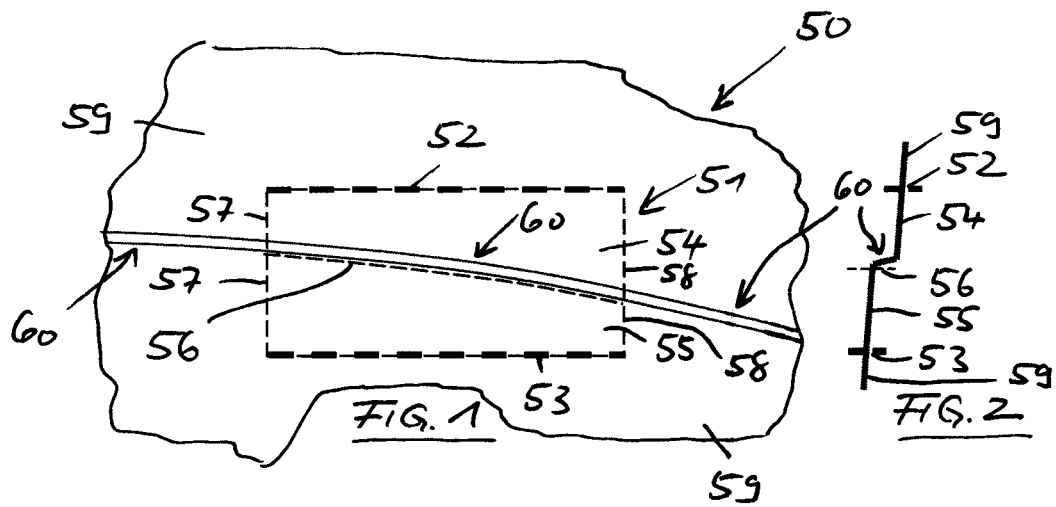
FIG. 1
FIG. 2
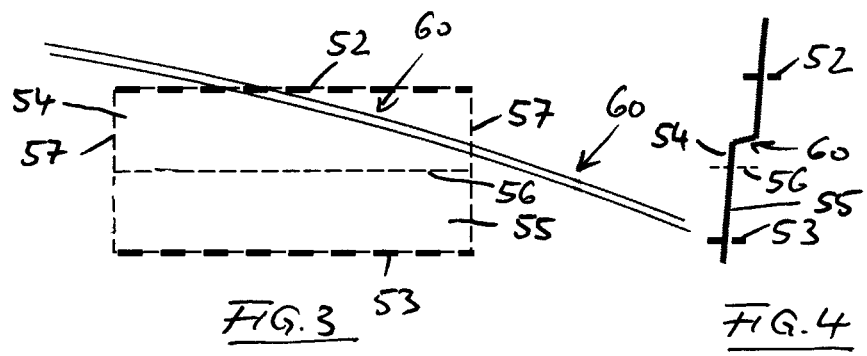
FIG. 3
FIG. 4
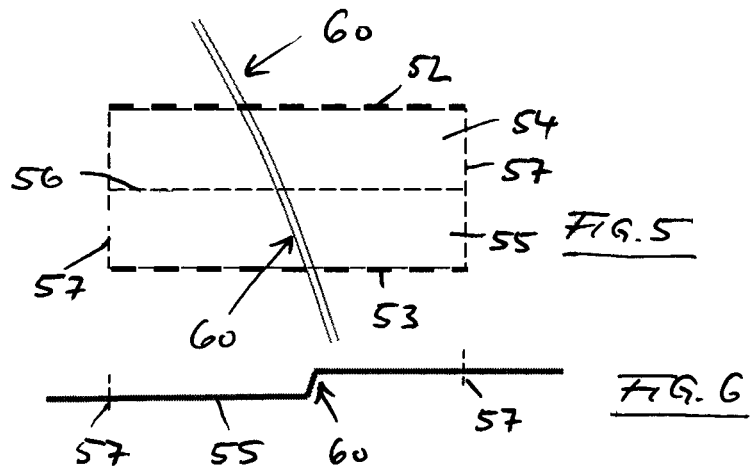
FIG. 5
FIG. 6

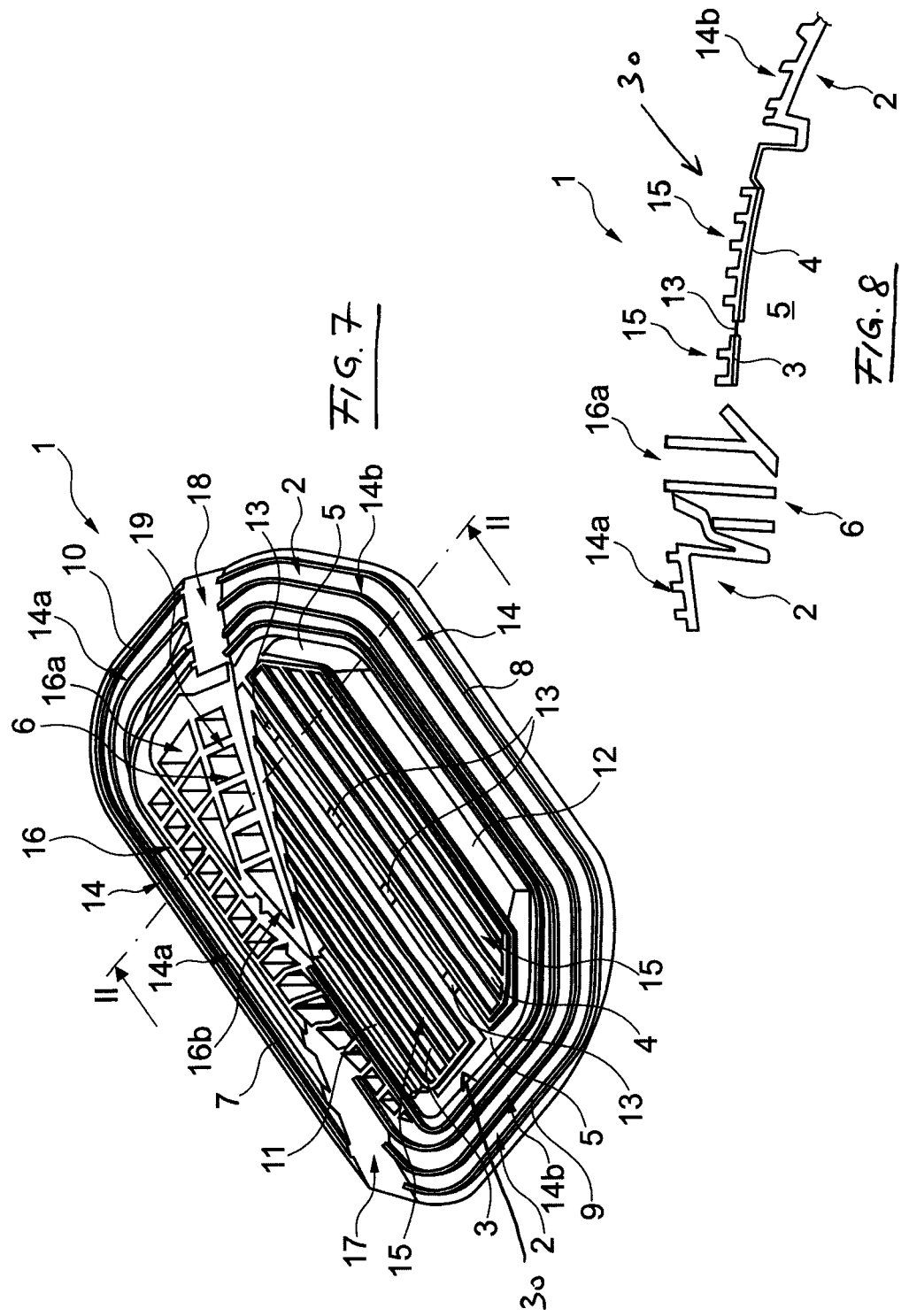

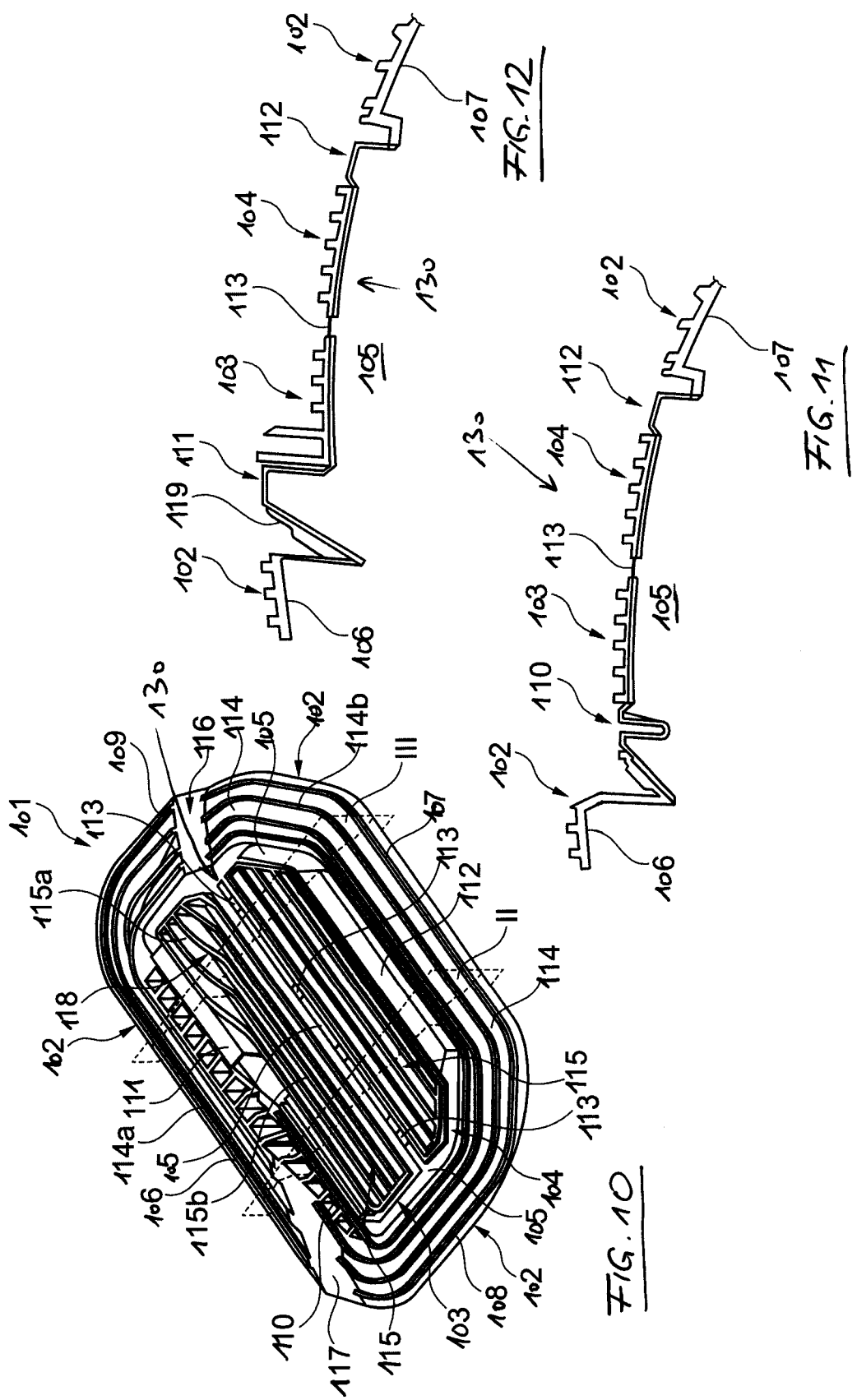

US 8,672,344 B2

CLADDING SECTION WITH AIRBAG FLAP ARRANGEMENT IN THE PASSENGER COMPARTMENT OF A MOTOR VEHICLE

CROSS-REFERENCE TO RELATED APPLICATION

This application claims priority to European Patent Application No. 10000963.8, filed Jul. 27, 2009, claims priority to German Patent Application No. 102009034916, filed Jul. 27, 2009, and claims priority to German Patent Application No. 102009034923, filed Jul. 27, 2009, which are all incorporated herein by reference in their entirety.

TECHNICAL FIELD

The invention relates to a cladding section in the passenger compartment of a motor vehicle, and the cladding section incorporates an airbag flap arrangement, which pivots along at least one hinge line when an airbag is deployed.

BACKGROUND

Cladding sections for airbag modules are extensively used in motor vehicles, in particular in passenger cars in conjunction with their instrument panels. For example, the airbag flap arrangement has a flap secured along a hinge line and at least one tear line, wherein the tear line rips and the flap pivots along the hinge when the airbag is deployed. Also known are airbag flap arrangements with several flaps, in particular two flaps, wherein the respective flap can be pivoted around a hinge line, and tear lines are correspondingly formed between the flap and the partial cladding segment enveloping it or the other airbag flap.

Airbag flap arrangements that seal the exit opening of a passenger airbag in the instrument panel and are opened by the latter upon activation of the passenger airbag have a flat surface with little or no contouring. Since the opening the flap arrangement is a highly dynamic process in which the flap arrangement itself is exposed to pre-stresses, the goal is to keep the complexity of the latter as low as possible. This is accomplished by giving the flap arrangement a flat and essentially even design.

The disadvantage to this flat and even shape of the flap arrangement combined with the even shape of the firing channel enveloping the flap arrangement on its side facing the vehicle passenger compartment has to do with the fact that the further cladding facing the vehicle passenger compartment, and hence visible to vehicle passengers, in particular an instrument panel comprising the further cladding, cannot be given a dynamic in design in terms of stronger contouring.

Known from DE 10 2006 008 564 A1 in a cladding for an airbag module is an airbag sliding device that ensures that when the airbag module is actuated, the airbag of the airbag module being filled with gas can deploy undamaged, thereby protecting the vehicle passengers.

At least one object of the present invention is to further develop the cladding section of the kind mentioned at the outset in such a way as to give it a dynamic appearance by way of a special configuration in the area of the airbag flap arrangement. In addition, other objects, desirable features, and characteristics will become apparent from the subsequent summary and detailed description, and the appended claims, taken in conjunction with the accompanying drawings and this background.

SUMMARY

The at least one object is achieved by virtue of the fact that the cladding section has a stepped height difference on the surface relative to the passenger compartment, and the airbag flap arrangement is located in the area of the height difference.

Therefore, the cladding section according to an embodiment of the invention makes it possible to impart a dynamically configured appearance in the passenger compartment of the motor vehicle based on the stepped height difference. This ability to visually upgrade the passenger compartment in the area of the airbag flap arrangement also makes it possible to correspondingly provide the area of the vehicle passenger compartment adjacent to the airbag flap arrangement, in particular the instrument panel, with a stepped height difference, meaning a dynamically configured appearance. The varying height levels in the area of the airbag flap arrangement and partial cladding segment enveloping it can then follow the height levels of the further cladding visible to the vehicle passengers, in particular the instrument panel.

The stepped height difference of the cladding section can be arranged or configured in a different way, wherein this embodiment certainly depends on whether the airbag flap arrangement has a single airbag flap or several, in particular two, airbag flaps.

Regardless of the number of airbag flaps, the stepped height difference can extend between the airbag flap arrangement and the partial cladding segment enveloping it. Therefore, the stepped height difference is caused by the transition between the cover flap arrangement and the partial cladding segment enveloping it. The dynamically configured appearance of the cladding section results from the stepped height difference at the transition from the cover flap arrangement to the partial cladding segment enveloping it.

Especially in cases where the airbag flap arrangement has two airbag flaps that can pivot around a respective hinge line and in particular form a central tear line between them, diverse advantageous embodiments of the cladding section are obtained, so as to achieve its dynamically configured appearance owing to the stepped height difference. The airbag flap arrangement can here certainly form respective lateral tear lines between the hinge line and central tear line. In addition, the hinge lines are advantageously parallel. For example, the stepped height difference extends along the central tear line. Another advantageous embodiment provides that the stepped height difference crosses the hinge line of one of the two airbag flaps and a lateral tear line of these airbag flaps. Further, the stepped height difference can cross the hinge lines and central tear line of the two airbag flaps.

If the airbag flap arrangement alternatively has a single airbag flap that pivots around a hinge line, it is regarded as advantageous for the ends of the hinge line to border lateral tear lines, which connect another tear line in the area of their other ends. This yields a structurally simple and inexpensively producible bearing for the individual airbag flap in the partial cladding segment enveloping it. In such a single airbag flap, the hinge line and additional tear line are advantageously arranged essentially parallel. This configuration ensures a reliable tearing of the tear line during actuation of the airbag, since when the airbag is actuated and strikes the airbag flap, the forces introduced into the latter cause a defined tearing along the tear line.

When designing the airbag flap arrangement with a single airbag flap, it is viewed as advantageous for the stepped height difference to cross the hinge line and/or the additional tear line, or extend between the cover flap arrangement and the partial cladding segment enveloping it.

Other than the stepped height difference, the respective airbag flap is preferably essentially even. This configuration minimizes the complexity of the flap, other than its incorporation in the area of the stepped height difference.

Another embodiment of the invention provides that the a firing channel be a component of the cladding section, and that the airbag flap arrangement seals an exit opening of the firing channel with the airbag not actuated. Since it is a component of the cladding section, this firing channel is also provided with the jump in height in the area of its surface facing the vehicle passenger compartment, helping to achieve the dynamically stronger contouring in this area of the cladding, in particular in this area of the instrument panel.

The airbag flap arrangement can have situated next to it an airbag sliding device, which is located in a gap between the airbag flap arrangement in the closed position and the firing channel. During inflation of the airbag, the airbag sliding device helps it deploy, and hence pass through the firing channel and exit the latter. In this case, in particular the jump in height is formed at the transition from the airbag flap arrangement to the partial cladding segment enveloping it, meaning the firing channel. Because the airbag flap arrangement does not have to have a varying height level, it can be easily mounted using the hinge and detachable connections, i.e., in the area of the tear line, and it is only necessary to pivot the flap arrangement around the axis formed by the hinge after detaching the detachable connection. When the flap opens, the airbag slides smoothly along the airbag sliding device, through the exit opening of the firing channel.

Another embodiment of the invention provides two flaps with the sides of the two flaps facing away from each other are connected with the firing channel via the hinges, and the two flaps are connected via the detachable connection.

When the airbag of the airbag module is actuated, the forces introduced into the flaps via the airbag hence sever the connections between the two flaps, causing both flaps exposed to the airbag to pivot around their hinge axis into the passenger compartment of the vehicle.

It is certainly possible to provide only one flap, which on the one side, in particular the side facing away from the airbag sliding device, is connected with the firing channel via the at least one hinge, and on the other side, in particular adjacent to the airbag sliding device, having at least one detachable connection and connected via the latter with the firing channel.

The hinge is preferably designed as a flexible hinge, in particular a textile hinge or film hinge. This makes it especially easy to fabricate, in particular as an injection molded part. The firing channel, airbag sliding device, the at least one flap and the at least one hinge along with the at least one detachable connection can all be designed as an injection molded part.

A preferred embodiment provides that the respective flap be designed as a plate, in particular a thin-walled plate with reinforcing ribs. This gives the rather thin flap enough stiffness to prevent damage, in particular fragmenting of the flap, as the flap opens and becomes exposed to the resultant high loads.

The varying height levels, in particular of the firing channel surface and/or surface of the airbag sliding device, are generated in particular by steps or inclines. In the final analysis, the selection of step or incline depends on the extent to which a dynamic appearance is to be imparted to the cladding of the airbag module or additional cladding.

The airbag sliding device can be a separate component incorporated in the firing channel. However, it is certainly conceivable for the airbag sliding device and firing channel to form a single structural unit, and hence consist of one part. In another alternative, the airbag sliding device can comprise a structural unit together with an instrument panel structure of the motor vehicle. In particular when the airbag sliding device represents a separate component, the latter is preferably designed as a foam element. The airbag sliding device consists in particular of metal or plastic.

The cladding according to an embodiment of the invention is used in particular in conjunction with another, thin-walled cladding, which has a surface allocated to the passenger compartment of the motor vehicle. This surface has height differences that correspond to the height differences in the surfaces of the airbag flap arrangement and partial cladding segment enveloping it, in particular of the firing channel and airbag sliding device. Another cladding preferably involves an instrument panel, in particular an instrument panel in the area of a passenger seat. The additional cladding can have a hard or soft surface. When using a soft surface, it is laminated with film or foamed in particular.

In order to be able to impart a more dynamic appearance to claddings for airbag modules, in particular the appearance of instrument panels, the invention hence proposes in particular that inclined or stepped height differences be realized on the instrument panel surface and firing channel surface, as well as the surface of the airbag sliding channel. These jumps in height can follow a straight or curved progression. The contour of the flap is designed in such a way that the latter remains as flat and even as possible. This means that the inclined or stepped height difference occurs in the area of the flap arrangement or next to the flap arrangement, for example in the area of the firing channel surface and the surface of the airbag sliding device. This configuration yields an exit opening of the firing channel that only partially covers the airbag. The airbag guiding device is provided to guide the airbag during its deployment. During the highly dynamic impingement of the airbag, it prevents damage to the airbag or instrument panel, since the airbag is smoothly guided in the direction of the exit opening.

In another embodiment of the invention, the latter hence relates to a cladding for an airbag module in a vehicle, with a firing channel and at least one flap accommodated therein for closing an exit opening of the firing channel, wherein the firing channel has a surface facing a passenger compartment of the motor vehicle, and the flap in the closed position has an essentially even surface facing the passenger compartment of the motor vehicle, wherein one side of the flap is connected via at least one hinge with the firing channel, and another side of the flap has at least one detachable connection, which is separated when the flap is opened. In this connection, the flap also has situated next to it an airbag gliding device, which is arranged in a gap between the flap in the closed position and the firing channel, and the firing channel surface and the surface of the airbag sliding device facing the passenger compartment of the motor vehicle are each formed by sections varying in height level, wherein elevated areas of the firing channel and airbag sliding device are adjacently arranged, and non-elevated areas of the firing channel and airbag sliding device are situated next to the flap, the surface of which is essentially flush with the surface of the non-elevated areas of the firing channel and airbag sliding device.

Another embodiment of the cladding section according to the invention has a firing channel and at least one flap accommodated therein for sealing an exit opening of the firing channel. The firing channel has a surface that faces a passenger compartment of the motor vehicle, and the flap in the closed position has a surface facing the passenger compartment of the motor vehicle. One side of the flap is connected with the firing channel via at least one hinge, and the side of the flap facing away from this side has at least one detachable connection, which is separated when opening the flap. The firing channel surface and flap surface are each formed by sections varying in height level, wherein elevated areas of the firing channel and flap are adjacently arranged, and non-elevated areas of the firing channel and flap adjacently arranged.

This configuration also enables a cladding that can be universally utilized in the motor vehicle; in particular one situated behind another cladding in a motor vehicle and has a stronger contouring.

In this embodiment, both the flap and firing channel, meaning the element enveloping the flap, are each designed with a varying height level. This varying height level can then follow the height levels of the other cladding visible to the vehicle passengers, in particular the instrument panel. This configuration of the cladding or instrument panel imparts the vehicle passenger compartment with a dynamic appearance.

In this embodiment, the hinge of the firing channel and flap is formed in the area of the varying height levels by means of different hinges, for example. As a result, given two different height levels each formed in the area of the firing channel or flaps, these two components cannot pivot relative to each other via these different hinges. Regardless of the fact that the jump in height also takes place in the exit area of the cladding, the use of different hinges allows a tension-free, uniform pivoting of the flap.

It is regarded as especially advantageous if the hinge connecting the non-elevated area of the firing channel and flap has a loop extending along the upward vertical extension of the firing channel or flap. The loop yields an accumulation of material that enables a uniform pivoting of the flap in a pivoting plane, since the loop is deformed while opening the flap, and then assumes an essentially elongated shape.

As a result, two provided flaps make it possible to separate the connections between the two flaps when the airbag of the airbag module is actuated due to the forces introduced into the flap via the airbag, wherein the two flaps exposed to the airbag pivot into the passenger compartment of the vehicle around their hinges. For example, one flap is designed as a flat plate, and the other flap has sections varyingly thick walls to form the sections of the flap surface with varying height levels.

The varying height level realized in the area of the firing channel and at least one flap of the cladding can be arranged in different ways. For example, it is provided that the incline and/or step formed by the varying height level crosses a hinge line formed by the hinge. It is further conceivable that the incline and/or step cross a tear line formed by the detachable connection.

BRIEF DESCRIPTION OF THE DRAWINGS

The present invention will hereinafter be described in conjunction with the following drawing figures, wherein like numerals denote like elements, and:

FIG. 1 illustrates a top view of the arrangement of the jump in height in the area of a tear line that connects both shutoff flaps;

FIG. 2 illustrates the side view of the arrangement according to FIG. 1;

FIG. 3 and FIG. 4 present depictions according to FIG. 1 and FIG. 2 for an arrangement of two airbag flaps, in which the jump in height runs in the area of a hinge line and a lateral tear line of one of the airbag flaps;

FIG. 5 and FIG. 6 present depictions according to FIG. 1 and FIG. 2 for another embodiment of an arrangement of airbag flaps, in which the jump in height intersects the hinge lines of the two airbag flaps and the tear line connecting the two airbag flaps.

FIG. 7 shows an exemplary embodiment of a spatial view of the cladding, which has a firing channel and an airbag sliding device;

FIG. 8A shows a section through the components according to sectional plane II-II on FIG. 7;

FIG. 10 is another configuration of the cladding section with firing channel, which has no airbag sliding device, viewed at an incline from above, with two sketched in sectional planes;

FIG. 11A is a section through the components according to sectional plane II on FIG. 10; and FIG. 12A is a section through the components according to sectional plane III on FIG. 10.

DETAILED DESCRIPTION

Figure 9:
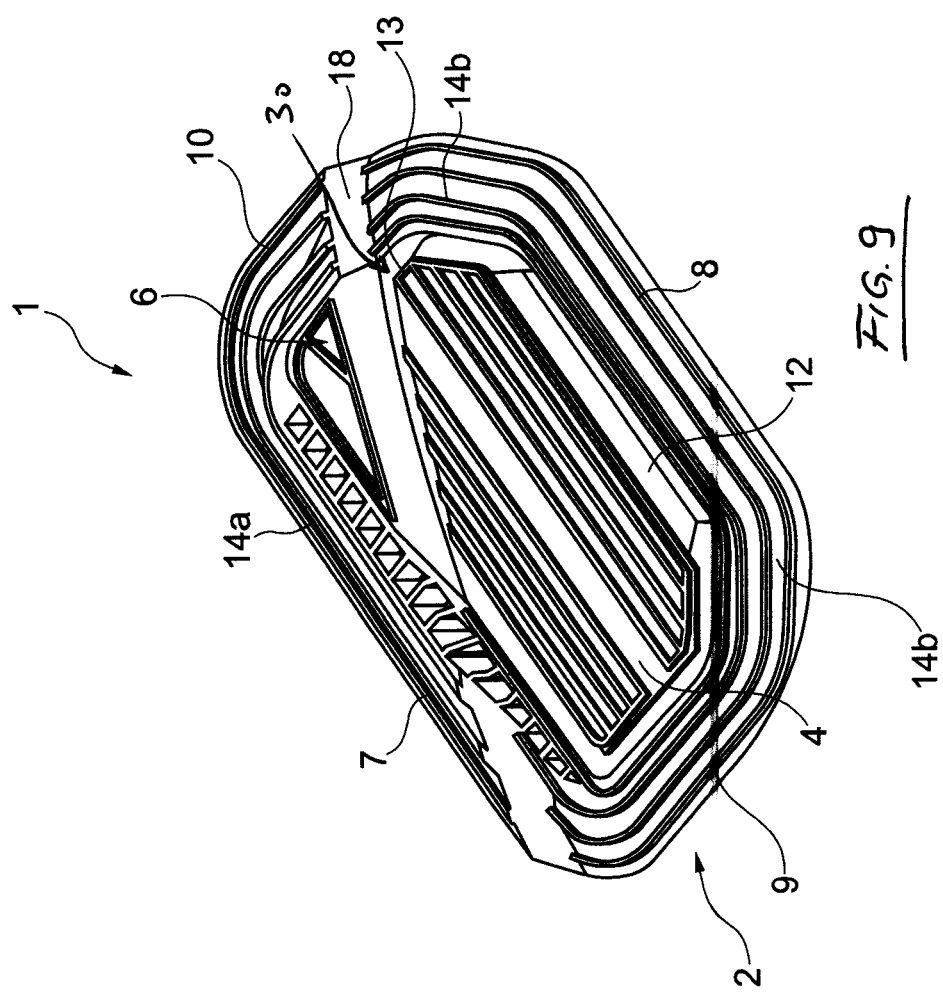
FIG. 9 is a spatial view for an exemplary embodiment modified relative to the exemplary embodiment according to FIG. 7, viewed at an incline from above.

The following detailed description is merely exemplary in nature and is not intended to limit or the application and uses. Furthermore, there is no intention to be bound by any theory presented in the preceding background or summary or the following detailed description.

FIG. 1 and FIG. 2 show the first embodiment of a cladding section 50 in the passenger compartment of a motor vehicle, in particular in the area of the instrument panel of a passenger car in the vicinity of a passenger airbag. The cladding section 50 has an airbag flap arrangement 51. The latter has two airbag flaps 54, 55 that can each pivot around a hinge line 52, 53 (or hinge 52, 53). These form a central tear line 56 between them, which hence represent a connection designed as a web that can be detached when the airbag is actuated. The hinge lines 52 and 53 are arranged parallel to each other. In the area of their free ends, hinge lines 52 and 53 connect these lateral tear lines 57 and 58, which are arranged parallel to each other, so that the lateral tear lines 57 and 58 and the hinge lines 52 and 53 form a rectangle. The lateral tear lines 57 and 58 border the sides of the airbag flaps 54 and 55, and are also positioned as a detachable connection or web relative to the partial cladding segment 59 enveloping the airbag flaps 54, 55.

The cladding section 50 has a difference in height in the form of a step 60 on the surface of the cladding section 50 facing the passenger compartment of the passenger car, and the airbag flap arrangement 51 is situated in the area of the height difference. Specifically, the step 60 extends along the central tear line 56, so that it is curved according to the illustrated slight bend in the central tear line 56, and continues to slightly curve beyond the two lateral tear lines 57, 58 in the partial cladding segment 59 enveloping the airbag flap arrangement 51. When the airbag is actuated, and the two airbag flaps 54 and 55 are hence impinged by the airbag of the airbag module, the airbag flap arrangement 51 tears along the central tear line 56 and lateral tear lines 57, 58, so that the two airbag flaps 54, 55 pivot around their hinge lines 52, 53 into the passenger compartment of the motor vehicle. The airbag flap arrangement 51 is here separated between the airbag flap 55 with a flat design and the airbag flap 54 that has the step 60 immediately adjacent to the central tear line, and the stop flap 54 continues from the elevated area of this step 60 along a flat trajectory toward the hinge line 52.

The embodiment according to FIG. 3 and FIG. 4 differs from the one according to FIG. 1 and FIG. 2 only in that the central tear line 56 is straight, and the airbag flap arrangement 51 is divided into two identically shaped airbag flaps 54, 55, so that the central tear line 56 is arranged parallel to the hinge lines 52 and 53. In this embodiment, the step 60 is additionally situated in the area of the airbag flap arrangement 15 and enveloping partial cladding segment 59 in such a way that the step 60 running along a slightly curved line crosses the hinge line 52 and lateral tear line 58 in the area of the airbag flap 54. As a result, the jump in height only takes place in the area of the airbag flap 54 and the enveloping partial cladding segment 59 arranged in the area of this airbag flap 54.

The embodiment according to FIG. 5 and FIG. 7 differs from the one according to FIG. 3 and FIG. 4 only in that the step 60 is positioned differently. The step 60 is again slightly curved in its longitudinal extension, and crosses both the hinge line 52 and hinge line 53, and as a consequence, the central tear line 56 as well. As a result, the step 26 divides the airbag flap arrangement 51 into two partial areas, wherein the separation takes place in about the middle of the airbag flap arrangement 51 between the lateral tear lines 57 and 58.

In the specific one exemplary embodiment of the invention according to FIG. 7 and FIG. 8, the components of a cladding 1 for the airbag module relevant to understanding the invention are illustrated, specifically the formation of a firing channel 2, the airbag flap arrangement 30 with two flaps 3 and 4, which are used to seal an exit opening 5 of the firing channel 2, as well as an airbag sliding device 6. Elements of the airbag module, such as the airbag, ignition device, etc., are not shown.

The firing channel 2 is annular, and the airbag of the airbag module passes through it upon actuation. The firing channel 2 has two longer sides 7 and 8 that are arranged essentially parallel to each other, and two sides 9 and 10 that connect the latter. In their closed position, the two flaps 3 and 4 essentially take up the cross section of the exit opening 5. The flap 3 is rectangular in the area of its one end, and triangular in the area of its other end. The other flap is trapezoidal in the area of the respective end. The flap 3 is connected by a hinge 11 with the firing channel 2 in the area of its side 7. The flap 4 is connected by a hinge 12 with the firing channel 2 in the area of its side 8. The two flaps 3 and 4 are interconnected in the area of the sides facing each other by means of several detachable connections 13 designed as webs.

The firing channel 2 has an annular continuous surface 14 that corresponds to the annular shape of the firing channel 2 and faces the passenger compartment of a motor vehicle, in particular of a passenger car. In relation to their illustrated closed position, the two flaps 3 and 4 also have a surface 16 facing the passenger compartment of the motor vehicle. The triangular end of the flap 3 creates a free space between the flap 3 and corner region of the firing channel 2 in the area of its sides 7 and 10 for accommodating the airbag sliding device 6 situated in the firing channel. Its surface facing the passenger compartment of the motor vehicle is marked with reference number 16.

The firing channel 2, the flaps 3 and 4, as well as the airbag sliding device are covered in a manner not shown in the area of their surfaces 14, 15 and 16 with another thin-walled cladding, which involves in particular the instrument panel cladding in the area of the passenger seat of the motor vehicle. Upon actuation of the airbag, the airbag is ignited, and as the airbag inflates, it is guided by the airbag sliding device 6 in the direction of the exit opening 5. While being inflated, the airbag presses against the two flaps 3 and 4, thereby separating the webs due to the forces introduced into the flaps 3 and 4, and the two flaps 3 and 4 can pivot around the axes of the hinges 11 and 12 into their open position. The other cladding tears in the process. This yields an exit opening in the cladding for the airbag. The airbag can exit through this opening into the passenger compartment of the vehicle and protect the vehicle passengers.

The hinges 11 and 12 are designed as textile hinges or film hinges, meaning that they are flexible.

The two flaps 3 and 4 are essentially flat, as evident from the sectional view according to FIG. 2. The flaps 3 and 4 each have the essentially flat surface 15 over their entire respective length. The region of the firing channel 2 adjacent to the flap 4 as well as the region of side 9 of the firing channel 2 also has an essentially flat area of the surface 14. In the closed position of the two flaps 3 and 4, these mentioned regions of the surface 14 and the surface 15 of the two flaps 3 and 4 essentially comprise a plane.

By contrast, the surface 14 of the firing channel 2 in the area enveloping the airbag sliding device 6 is not flat in design, but rather has a jump in height 17 proceeding from the end of the side 7 of the firing channel 2 adjacent to the side 9. The surface 14 runs along the higher level formed in this way until the corner in the area of sides 7 and 10 of the firing channel 2, and from there continues on the elevated level until about the elongation of the separating joint between the two flaps 3 and 4; from there it passes to another jump in height 18 form a higher level in the area of the side 10 to a lower level in the area of this side. As a consequence, the firing channel 2 has a surface region 14a with an elevated level, and a surface region 14b with a non-elevated level.

The essentially triangular airbag sliding device 6 as viewed from the top is also not flat in design. The region of its surface 16 adjacent to the corner of the sides 7 and 10 exhibits an elevated surface region 16a. The remaining area of the airbag sliding device 6 with a surface region 16b that is not elevated is connected with the elevated surface region 16a by a jump in height 19 aligned with the jumps in height 17 and 18. In relation to the corner region of the firing channel 2, this elevated surface region 16a forms a flat surface in the area of sides 7 and 10, generated by the surface regions 16a and 14a.

The described varying height levels of the firing channel 2 and airbag sliding device 6 during the formation of flat flaps 3 and 4 make it possible to strongly contour these components so as to also impart strong contouring to the cladding that covers these components. This makes it possible to give this cladding of the airbag module visible to the vehicle passengers a dynamic appearance in terms of the strong contouring.

The exemplary embodiment according to FIG. 9 differs from the one according to FIG. 7 and FIG. 8 only in that the two flaps 3 and 4 are replaced by just a single flap 4, the shape of which corresponds to the flaps 3 and 4 in the exemplary embodiment according to FIG. 1, wherein the webs provided between the flaps 3 and 4 therein are omitted, and replaced instead with a durable, fixed connection between the flaps 3 and 4 to form the single flap 4 in the exemplary embodiment according to FIG. 3. This one flap 4 is connected with the firing channel 2 in the area of side 9 by a hinge 12. The detachable connection 13 in the form of a web connects the flap 4 with the firing channel 2 in the area of its side 10, specifically in the non-elevated surface region 14b in front of the jump in height 18.

For example, the airbag sliding device 6 is designed as a foamed element. In particular, it consists of plastic. Metal is certainly also suitable as a material for the airbag sliding device.

The surface of the other cladding visible to the vehicle passengers that faces the passenger compartment of the motor vehicle has differences in height corresponding to the differences in height of the surfaces of the firing channel 2 and airbag sliding device 6, and is shaped in the area of the flaps 3 and 4 in accordance with their essentially flat surface. This cladding can have a hard surface or a soft surface. A cladding with a soft surface is formed in particular via laminated film, or with a foam.

The other embodiment according to FIG. 10 to FIG. 12 is described as follows. The firing channel 102 is annular, and the airbag of the airbag module passes through it upon actuation. The firing channel 102 has two longer sides 106 and 107 that are arranged essentially parallel to each other, and two sides 108 and 109 that connect the latter. In their closed position, the two flaps 103 and 104 comprising the flap arrangement 130 essentially take up the cross section of the exit opening 105. One flap 103 adjacent to side 106 is connected with the side 106 of the firing channel via two hinges 110 and 111. The respective hinge 110 or 111 extends over a length that is somewhat shorter than half the length of the flap 103. The side of the flap 104 facing the side 107 of the firing channel 102 is connected by a hinge 12 with the firing channel 102, wherein the hinge 112 has a length that is slightly shorter than the length of the flap 104 in the area of its side facing the side 107 of the firing channel 102. In the area of the sides facing each other, the two flaps 103 and 104 are interconnected by means of several detachable connections 113 designed as webs.

The firing channel 102 has an annular continuous surface 114 that corresponds to the annular shape of the firing channel 102 and faces the passenger compartment of a motor vehicle, in particular of a passenger car. In relation to their illustrated closed position, the two flaps 103 and 104 also have a surface 115 facing the passenger compartment of the motor vehicle. The firing channel 102 and the flaps 103 and 104 are covered in a manner not shown in the area of their surfaces 114 and 115 with another thin-walled cladding, which involves in particular the instrument panel in the area of the passenger seat of the motor vehicle. This instrument panel can have a hard surface or a soft surface. When the airbag is actuated, the airbag inflates and presses against the two flaps 103 and 104, thereby separating the webs 113 due to the forces introduced into the flaps 103 and 104, and the two flaps 103 and 104 can pivot around the hinges 110 and 111 or 112 into their open position, tearing open the cladding in the process. This yields an exit opening in the cladding for the airbag. The airbag can exit through this opening into the passenger compartment of the vehicle and protect the vehicle passengers.

Hinges 110, 111 and 112 are designed as textile hinges or film hinges, meaning that they are flexible.

The flap 104 is essentially flat, as evident from the sectional views. Therefore, it has an essentially flat surface 115 over its entire length. The region of the firing channel 102 adjacent to the flap 104 also has an essentially flat surface 114. In the closed position of the two flaps 103 and 104, the surface 115 of the flap 104 and the region of the surface 114 of the firing channel enveloping it essentially comprise a plane.

By contrast, the surface 114 of the firing channel 102 in the area enveloping the other flap 103 is not flat in design, but rather has a jump in height 116 proceeding from the side 107, at roughly half the length of the side 109. The surface 114 runs along the higher level formed in this way until the corner in the area of sides 109 and 106 of the firing channel 102, and from there continues on the elevated level, dropping slightly to the area of the firing channel 102 where the sides 106 and 108 coincide. Another jump in height 117 there comes about from the higher level in the area of the side 106 to the lower level in the area of side 107. As a consequence, the firing channel 102 has a surface region 114a with an elevated level, and a surface level 114b with a non-elevated level.

As opposed to flap 104, flap 103 is not flat in design, and has an elevated surface region 115a in the area of its surface 115, adjacent to the corner of sides 106 and 109. The connecting area of the flap 103 with a non-elevated surface region 115b is connected with the elevated surface region 115a by a jump in height 118. In relation to the corner region of the firing channel 102, the elevated surface region 115a forms a flat surface in the area of sides 106 and 109, generated by the surface regions 115a and 114a.

As can be gleaned in particular from the depiction on FIG. 11 and FIG. 12, the jumps in height 117 and 118 causes the flap 103 to be joined with the firing channel 102 by way of the hinge 110 located at a lower level, while the flap 103 is joined with the firing channel 102 in the area of its higher level via the hinge 111 arranged at a higher level. Without taking any additional measures, this would mean that the flap 103 pivots around swiveling axes of the hinges 110 and 111 arranged at varying height levels. In order to make the flap 103 pivot around the same swiveling axis in the area of the hinges 110 and 111 when inflating the airbag and hence pivoting the flaps 103 and 104 into their open position, the hinge 110 is designed as a loop that extends upward from the firing channel 102 or 103. This loop is not realized in the area of hinge 111, which is situated at a higher level.

The depiction on FIG. 10 also reveals that the jump in height 116 or jump in height 117 or jump in height 118 crosses the hinge line formed by hinges 110 and 111 or the tear line formed by the detachable connections 113 between the flaps 103 and 104.

In the illustrated, not visible integrated cladding, the stages can basically be arranged in such a way that they cross both tear lines and hinge lines. As shown, this makes it possible to realize a passenger airbag flap with at least two different heights. Since the jump in height runs through at least one hinge line, it is necessary that the flap permit pivoting via two different heights.

Taking the above aspect into account, an instrument panel with a hard surface or one with a soft surface can be realized with slight differences.

In an instrument panel with a hard surface, the hinge arrangement is divided in the area of the jump in height, which yields the resultant hinges 110 and 111. The hinges are secured by an attachment element flat on one side to the flap 103 in such a way that the one hinge 11 is situated on the upper flap half, and the other hinge 110 is arranged on the lower flap half in a manner in which material accumulates in a looping fashion, enabling a uniform pivoting of the flap 103 in a pivoting plane. The other flap 104 can already pivot in a pivoting plane without any problem due to the flat design.

A gap now forms between the attachment element and flap in the area of the higher flap plane of the flap 103, and can be used to connect the two components. This connection is necessary, since the flap 103 is exposed to high physical loads during the process of opening the airbag. In order to prevent the components from detaching, the connection is established here as well. To this end, the gap is filled in such a way as to enable a connection of the two components. While this can be accomplished by a suitable arrangement of ribs 119, the incorporation of additional components is also conceivable.

In an instrument panel with a soft surface, the two hinges 110 and 111 are also used in the area of flap 103. The one hinge 111 is arranged on the higher flap half, and the other hinge 110 is arranged on the lower flap half, thereby resulting in the described looping material accumulation, which permits the uniform pivoting of the flap 103 in a pivoting plane. Attachment here takes place without additional attachment elements, for example via injection. To impart a uniform working surface to the airbag, the progression of the lower flap half is continued in the area of the higher flap half of the flap 103. This yields a two-layer structure with a gap. The latter can be filled and reinforced with a suitable array of ribs. However, the height difference between the lower and upper flap half of the flap 103 can alternatively be leveled by applying foam or attaching some other additional components.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A cladding section in a passenger compartment of a motor vehicle, comprising:
    a surface facing the passenger compartment; and
    an airbag flap arrangement comprising two airbag flaps that are adapted to pivot around respective hinge lines and form a central tear line between them,
    wherein the surface includes a step defining a height difference disposed at least partially between the hinge lines,
    wherein the step extends between the airbag flap arrangement and a partial cladding segment enveloping it, and
    wherein the step crosses the respective hinge line of at least one of the two airbag flaps and a lateral tear line of the at least one of the two airbag flaps.

2. The cladding section according to claim 1, wherein respective lateral tear lines are formed between the respective hinge line and the central tear line.

3. The cladding section according to claim 1, wherein the hinge lines are substantially parallel.

4. The cladding section according to claim 1, wherein the step extends along the central tear line.

5. The cladding section according to claim 1, wherein the step crosses the hinge lines and the central tear line of the two airbag flaps.

6. The cladding section according to claim 1, wherein the airbag flap arrangement comprises a single airbag flap that is adapted to pivot around a hinge line and a tear line connects the airbag flap with an enveloping partial cladding segment to a side of the hinge line.

7. The cladding section according to claim 1, further comprising a firing channel as a component of the cladding section, and the airbag flap arrangement is adapted to seal an exit opening of the firing channel with the airbag in a non-actuated condition.

8. The cladding section according to claim 7, further comprising an airbag sliding device arranged next to the airbag flap arrangement and situated in a gap between the airbag flap arrangement located in a closed position and the firing channel.

9. The cladding section according to claim 7, wherein a firing channel surface and the surface of the airbag flap arrangement allocated to the passenger compartment are each formed by sections varying in height level, wherein elevated areas of the firing channel are adjacently arranged, and non-elevated areas of the firing channel and flap are adjacently arranged.

10. A cladding section in a passenger compartment of a motor vehicle, comprising:
    a surface facing the passenger compartment; and
    an airbag flap arrangement comprising two airbag flaps that are adapted to pivot around a respective hinge line and form a central tear line between them upon airbag activation;
    wherein the surface includes a step defining a height difference disposed at least partially between the hinge lines,
    wherein the step extends along the central tear line, and
    wherein the step crosses the respective hinge line of at least one of the two airbag flaps and a lateral tear line of the at least one of the two airbag flaps.

11. The cladding section according to claim 10, wherein the step crosses the hinge lines and the central tear line of the two airbag flaps.

12. A cladding section in a passenger compartment of a motor vehicle, comprising:
    a surface relative to the passenger compartment, said surface including a step defining a height difference;
    an airbag flap arrangement having a single airbag flap that is adapted to pivot around a hinge line upon airbag actuation; and
    a tear line connecting the airbag flap with an enveloping partial cladding segment to a side of the hinge line;
    wherein the step crosses the hinge line.

13. The cladding section according to claim 12, wherein the hinge line and an additional tear line are essentially parallel.

14. The cladding section according to claim 12, wherein the step crosses the tear line.

15. The cladding section according to claim 12, wherein the step extends between the airbag flap arrangement and a partial cladding segment enveloping it.

\* \* \* \* \*